United States Patent
Yang et al.

(10) Patent No.: US 8,626,812 B2
(45) Date of Patent: Jan. 7, 2014

(54) HYBRID GREATEST COMMON DIVISOR CALCULATOR FOR POLYNOMIALS

(75) Inventors: Xu Yang, Beijing (CN); Xiaolin Quan, Beijing (CN); Dongmei Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/790,645

(22) Filed: May 28, 2010

(65) Prior Publication Data
US 2011/0295921 A1 Dec. 1, 2011

(51) Int. Cl.
*G06F 7/72* (2006.01)
(52) U.S. Cl.
USPC .......................................................... 708/492
(58) Field of Classification Search
None
See application file for complete search history.

(56) References Cited

U.S. PATENT DOCUMENTS

| | | | |
|---|---|---|---|
| 6,480,605 B1 | 11/2002 | Uchiyama et al. | |
| 6,609,117 B2 | 8/2003 | Sutherland et al. | |
| 7,003,537 B1 * | 2/2006 | Tamura | 708/492 |
| 7,120,248 B2 | 10/2006 | Hopkins et al. | |
| 2002/0087884 A1 | 7/2002 | Shacham et al. | |
| 2005/0018842 A1 | 1/2005 | Fu et al. | |
| 2011/0295921 A1 * | 12/2011 | Yang et al. | 708/650 |

OTHER PUBLICATIONS

Cooperman, Feisel, von zur Gathen, Havas, "GCD of Many Integers (Extended Abstract)", retrieved on Apr. 19, 2010 at <<http://citeseerx.ist.psu.edu/viewdoc/download?doi=10.1.1.73.3&rep=rep1&type=pdf>>, Springer-Verlag Berlin, Lecture Notes in Computer Science, Conference on Computing and Combinatorics (COCOON), vol. 1627, 1999, pp. 310-317.

Freund, "GCD and Factorisation of multivariate polynomials", retrieved on Apr. 19, 2010 at <<http://www14.informatik.tu-muenchen.de/konferenzen/Jass07/courses/1/Freund/Freund_Paper.pdf>>, JASS Technology Course, The Power of Polynomials and How to Use Them, Mar. 28, 2007, pp. 1-8.

Hemmer, Hulse, "Generic implementation of a modular gcd over Algebraic Extension Fields", retrieved on Apr. 19, 2010 at <<http://domino.mpi-inf.mpg.de/intranet/ag1/ag1publ.nsf/3561a79a83e6557ac1256b91004f4bdd/f4397834f8c33046c125755b00566e16/FILE/final.pdf>>, European Workshop on Computational Geometry, 2009, pp. 321-324.

Kaltofen, "Greatest Common Divisors of Polynomials Given by Straight-Line Programs", retrieved on Apr. 19, 2010 at <<http://oldweb.cecm.sfu.ca/personal/pborwein/images/rand_imgs/l29n7f3l.pdf>>, ACM, Journal of the ACM, vol. 35, No. 1, Jan. 1988, pp. 231-264.

(Continued)

*Primary Examiner* — David H Malzahn
(74) *Attorney, Agent, or Firm* — Lee & Hayes, PLLC (57) ABSTRACT

A hybrid greatest common divisor (GCD) calculator analyzes characteristics of polynomials and selects a particular GCD algorithm from multiple available GCD algorithms based on a combination of characteristics of the polynomials. The selected GCD algorithm is then applied to calculate the GCD of the polynomials.

19 Claims, 6 Drawing Sheets

(56) References Cited

OTHER PUBLICATIONS

Kaltofen, "Single-Factor Hensel Lifting and its Application to the Straight-Line Complexity of Certain Polynomials", retrieved on Apr. 19, 2010 at <<http://citeseerx.ist.psu.edu/viewdoc/download-?doi=10.1.1.39.8886&rep=rep1&type=pdf>>, ACM, Symposium on Theory of Computing, 1987, pp. 443-452.

Kuchlin, "On the Multi-Threaded Computation of Integral Polynomial Greatest Common Divisors", retrieved on Apr. 19, 2010 at <<http://library.ukrweb.net/book/__svalka/anri/scientific-library.net/vol2/Ax-books/Disk_05/ISSAC-Proceedings/ISSAC91/p333-kuchlin.pdf>>, ACM, Proceedings of Conference on Symbolic and Algebraic Computation, 1991, pp. 333-342.

van Hoeij, Monagan, "Algorithms for Polynomial GCD Computation over Algebraic Function Fields", retrieved on Apr. 19, 2010 at <<http://www.cecm.sfu.ca/~pborwein/MITACS/papers/monagan.pdf>>, ACM, Conference on Symbolic and Algebraic Computation (ISSAC), Jul. 4, 2004, pp. 297-304.

\* cited by examiner

Figure 1

| Large Coefficients | High Power | Sparse | Multivariate | Univariate | GCD Algorithm |
|---|---|---|---|---|---|
|  |  |  |  |  | MGCD |
|  |  |  |  | X | MGCD |
| X |  |  |  | X | PRS, HEU |
|  | X |  |  | X | HEU |
|  |  | X |  | X | HEU |
|  | X | X |  | X | EZGCD |
| X | X |  |  | X | MGCD |
| X |  | X |  | X | MGCD |
| X | X | X |  | X | MGCD |
| X |  |  |  |  | EZGCD |
|  | X |  |  |  | MGCD |
|  |  | X |  |  | MGCD |
|  | X | X |  |  | EZGCD |
| X | X |  |  |  | EZGCD |
| X |  | X |  |  | EZGCD |
| X | X | X |  |  | EZGCD |
|  |  |  | X |  | MGCD |
| X |  |  | X |  | MGCD |
|  | X |  | X |  | HEU |
|  |  | X | X |  | HEU |
|  | X | X | X |  | EZGCD |
| X | X |  | X |  | EZGCD |
| X |  | X | X |  | EZGCD |
| X | X | X | X |  | EZGCD |

HYBRID GREATEST COMMON DIVISOR CALCULATOR FOR POLYNOMIALS

BACKGROUND

Computer algebra systems are computer-implemented applications that manipulate mathematical expressions in symbolic form. Computer algebra has many applications in fields such as physics, engineering, and education.

One specific function performed by many computer algebra systems is the calculation of the greatest common divisor (GCD) of two polynomials. There are many algorithms that may be used for calculating the GCD of two polynomials. The computational expense of calculating the GCD depends on the complexity of the two polynomials and the algorithm used.

SUMMARY

This document describes computer algebra techniques for calculating the greatest common divisor (GCD) of two polynomials. Characteristics of the polynomials are analyzed, and based on the analysis, a particular GCD algorithm is selected from among multiple available GCD algorithms. Characteristics of the two polynomials may include, but are not limited to, a number of variables, size of coefficients, powers of the variables, and distribution of powers of the variables.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

A hybrid greatest common divisor (GCD) calculator selects and applies a particular GCD algorithm from multiple available GCD algorithms based on a determined combination of characteristics of two input polynomials.

The discussion begins with a section entitled "Example Hybrid GCD Algorithm," which describes one non-limiting series of processes that may be implemented to calculate the GCD of two polynomials. A section entitled "Example Computer Device" follows, and illustrates and describes an example computing device that may implement the described hybrid GCD algorithm. A third section, entitled "Example Operation," illustrates and describes an example process for calculating the GCD of two polynomials. Finally, the discussion ends with a brief conclusion.

This brief introduction, including section titles and corresponding summaries, is provided for the reader's convenience and is not intended to limit the scope of the claims, nor the proceeding sections.

Example Hybrid GCD Algorithm

Figure 1:
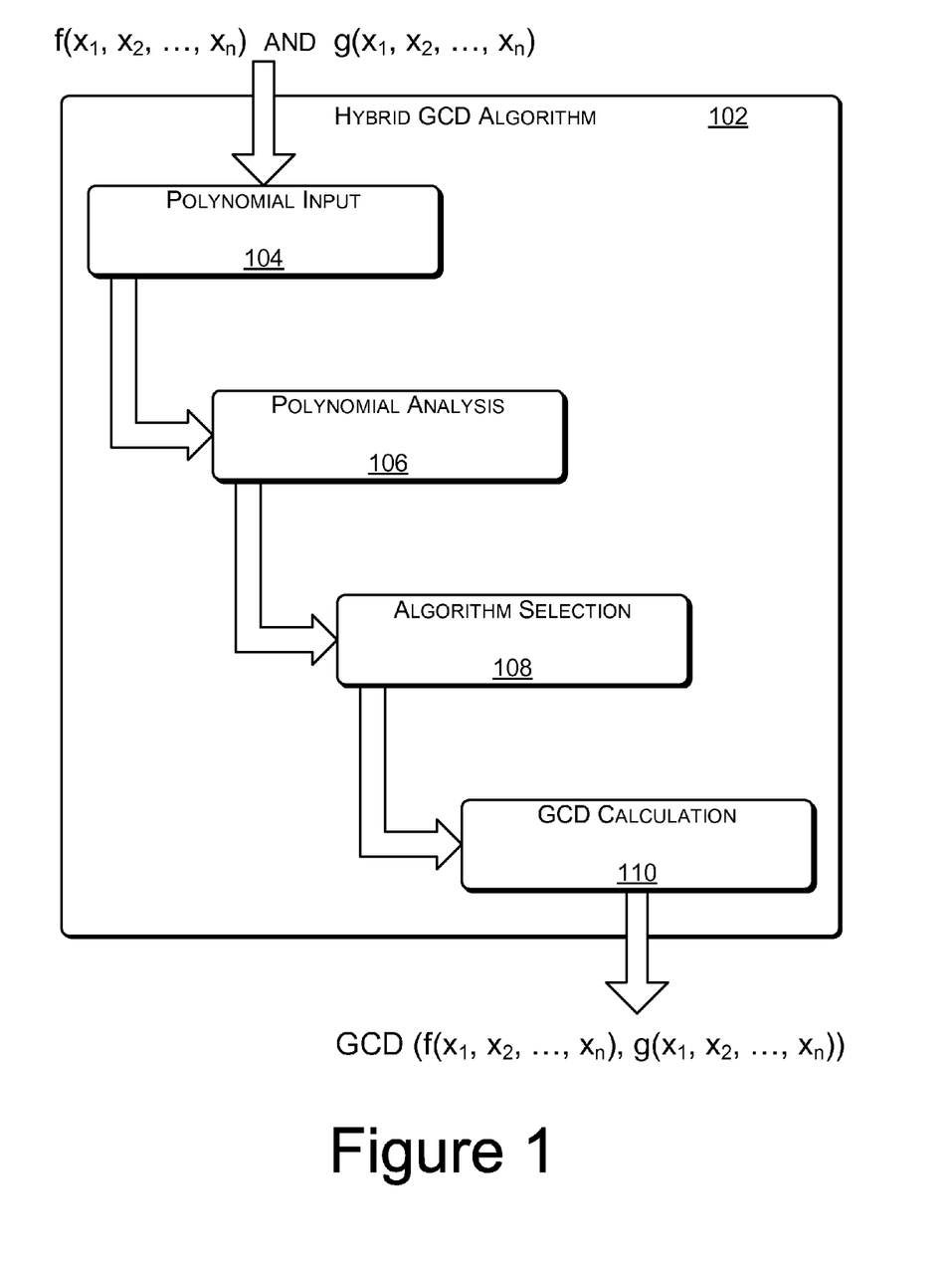
FIG. 1 is a block diagram that illustrates processes associated with an example hybrid greatest common divisor (GCD) algorithm.

FIG. 1 illustrates processing performed by an example hybrid GCD algorithm 102. Hybrid GCD algorithm 102 performs polynomial input 104, polynomial analysis 106, algorithm selection 108, and GCD calculation 110. In performing polynomial input 104, hybrid GCD algorithm 102 receives two polynomials (e.g., $f(x_1, x_2, \ldots, x_n)$ and $g(x_1, x_2, \ldots, x_n)$).

In performing polynomial analysis 106, hybrid GCD algorithm 102 analyzes the two received polynomials for various characteristics. For example, hybrid GCD algorithm 102 analyzes the polynomials to determine whether the polynomials are univariate (i.e., having only a single variable), multivariate (i.e., having more than three variables), or neither (i.e., having two or three variables). Hybrid GCD algorithm 102 also analyzes the polynomials to determine if the polynomials contain large coefficients, high-power variables, or sparse powers across the variables.

Large coefficients may be defined based on a number system supported by a system in which hybrid GCD algorithm 102 is implemented. For example, in a 32-bit computer system, 32 bits are available to store numbers. Accordingly, as one example, a large coefficient is defined as any coefficient that is larger than the maximum number that can be stored in 32 bits.

Similarly, high-power variables may be defined in various ways. In one example, a polynomial is determined to have high-power variables if at least one variable has a power greater than 1000.

A polynomial is determined to have sparse powers across the variables if there is a large gap between powers of a variable. For example, the polynomial $f(x,y)=x^{1000}-y$ has sparse powers across the variables.

After analyzing the characteristics of the input polynomials, hybrid GCD algorithm 102 performs algorithm selection 108 to select an appropriate GCD algorithm based on the determined characteristics. Hybrid GCD algorithm 102 includes multiple distinct GCD algorithms that may be used to calculate the GCD for any two input polynomials. The multiple distinct GCD algorithms may include, for example, PRS (polynomial remainder sequences GCD algorithm), HEU (heuristic polynomial GCD algorithm), EZGCD (extended Zassenhaus GCD algorithm), and MGCD (modular GCD algorithm). Each of these algorithms is well known to those skilled in the art as an algorithm for calculating the GCD of two polynomials.

Hybrid GCD algorithm 102 then performs GCD calculation 110 according to the selected GCD algorithm. The result is the GCD of the two input polynomials.

Figure 2:
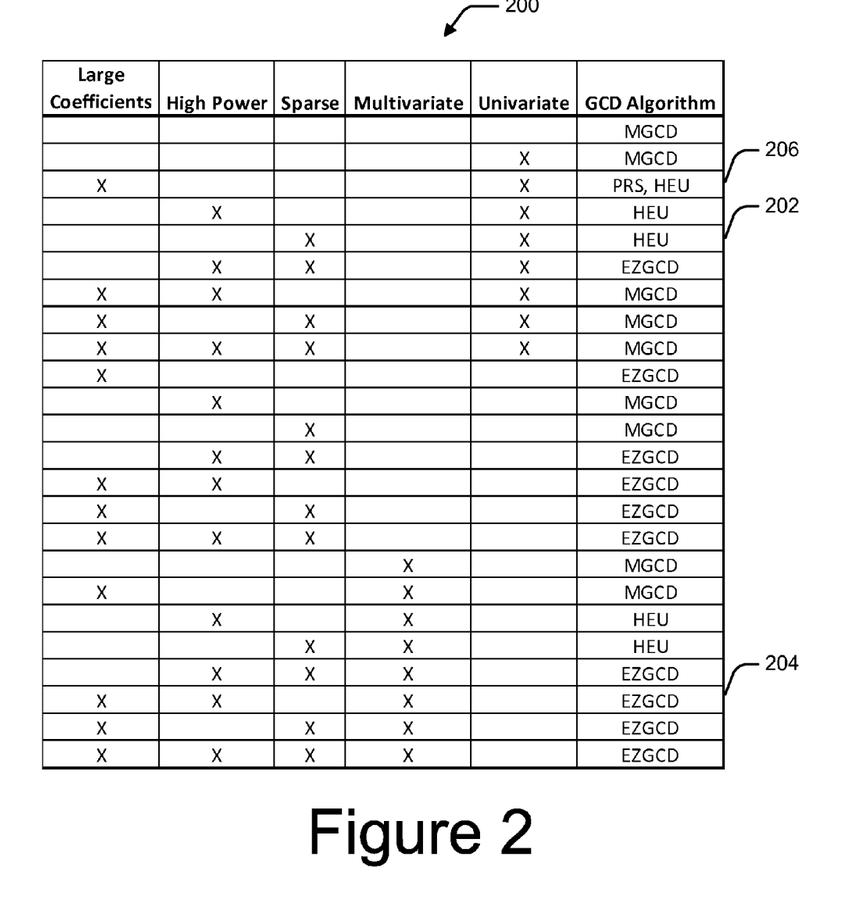
FIG. 2 is a table that illustrates example relationships between characteristics of polynomials and particular algorithms for calculating the GCD of polynomials.

FIG. 2 illustrates combinations of polynomial characteristics and corresponding GCD algorithms. For example, as shown in row 202 of table 200, if the input polynomials are univariate with sparse powers across the variables, then hybrid GCD algorithm 102 selects the HEU algorithm to calculate the GCD of the two input polynomials. Similarly, as shown in row 204 of table 200, if the input polynomials are multivariate with large coefficients and high powers, then hybrid GCD algorithm 102 selects the EZGCD algorithm to calculate the GCD of the two input polynomials. Row 206 of table 200 illustrates a special scenario in which, if the input polynomials are univariate with large coefficients, hybrid GCD algorithm 102 first selects the PRS algorithm to calculate the GCD of the two input polynomials. If the PRS algorithm is not successful, then hybrid GCD algorithm 102 applies the HEU algorithm to calculate the GCD of the two input polynomials.

Example Computing Device

Figure 3:
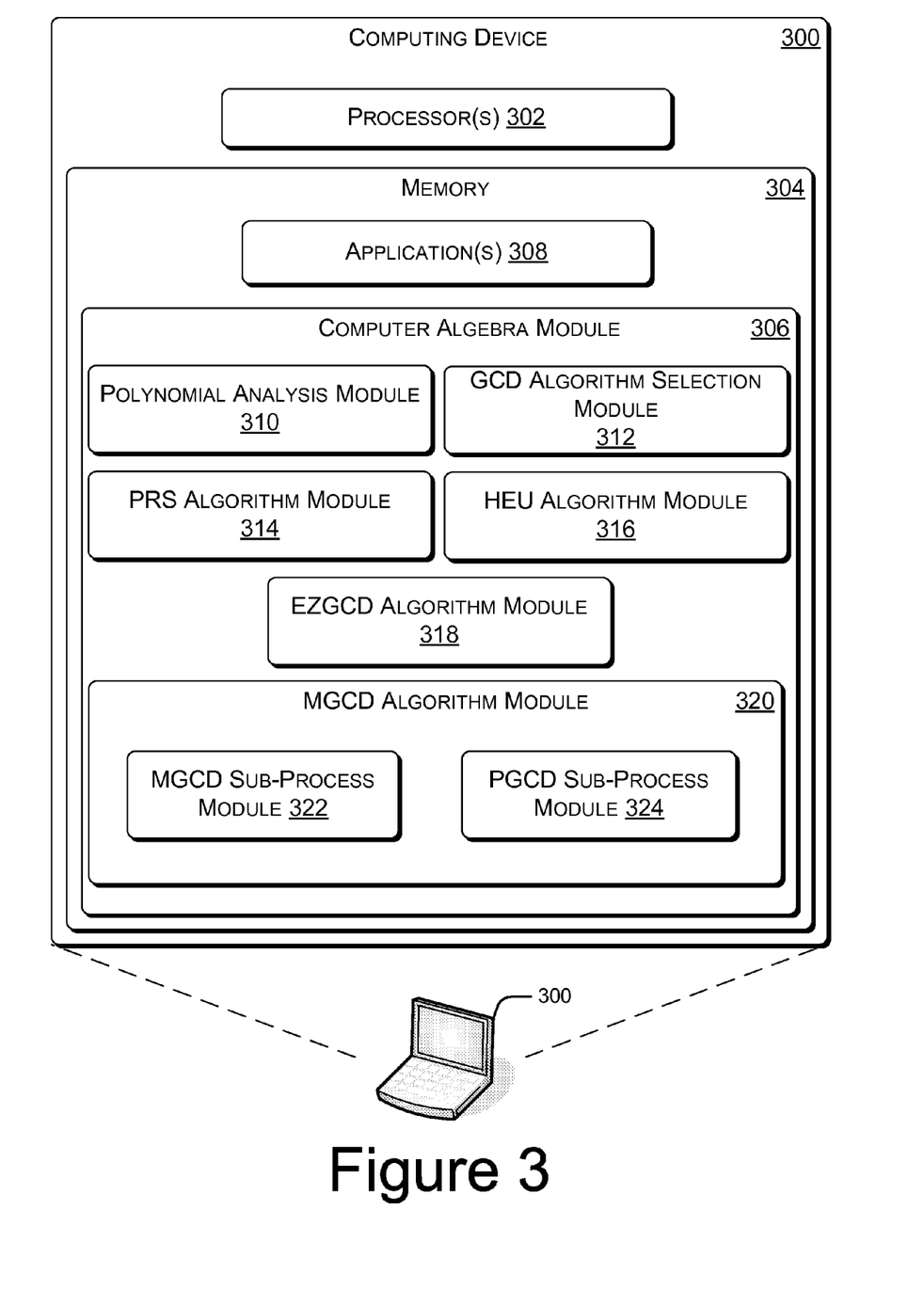
FIG. 3 is a block diagram that illustrates components of an example computing device that implements the hybrid GCD algorithm of FIG. 1.

FIG. 3 illustrates an example computing device 300 that may implement the techniques for calculating the greatest common factor of two polynomials. Computer device 300 includes one or more processors 302 and memory 304 to execute a computer algebra module 306 and any number of other applications 308.

Computer algebra module 306 includes polynomial analysis module 310, GCD algorithm selection module 312, and various modules for performing specific GCD calculations. For example, computer algebra module 306 includes PRS algorithm module 314, HEU algorithm module 316, EZGCD algorithm module 318, and MGCD algorithm module 320. Computer algebra module 306 may also include other specific GCD calculation algorithm modules.

Polynomial analysis module 310 is implemented to receive two input polynomials, and to analyze the polynomials based on a set of predefined characteristics. For example, as described above with reference to FIG. 1, polynomial analysis module 310 analyzes received polynomials to determine whether the polynomials are univariate, multivariate, or neither, and also to determine whether the polynomials contain large coefficients, high-power variables, or sparse powers across the variables.

GCD algorithm selection module 312 is implemented to select one of the multiple available GCD algorithms, based on results from polynomial analysis module 310. For example, as described above with reference to FIG. 2, GCD algorithm selection module 312 selects a particular GCD algorithm based on the determined combination of characteristics of the input polynomials.

PRS algorithm module 314 is implemented to calculate the GCD of two input polynomials according to the PRS algorithm. For example, as shown in FIG. 2, if the input polynomials have large coefficients and are univariate, the GCD algorithm selection module 312 selects the PRS algorithm module 314 to calculate the GCD of the two input polynomials.

HEU algorithm module 316 is implemented to calculate the GCD of two input polynomials according to the HEU algorithm. For example, as shown in FIG. 2, if the input polynomials contain high-power variables and are multivariate, the GCD algorithm selection module 312 selects the HEU algorithm module 316 to calculate the GCD of the two input polynomials.

EZGCD algorithm module 318 is implemented to calculate the GCD of two input polynomials according to the EZGCD algorithm. For example, as shown in FIG. 2, if the input polynomials contain large coefficients, contain high-power variables, and are multivariate, the GCD algorithm selection module 312 selects the EZGCD algorithm module 318 to calculate the GCD of the two input polynomials.

MGCD algorithm module 320 is implemented to calculate the GCD of two input polynomials according to the MGCD algorithm. For example, as shown in FIG. 2, if the input polynomials contain high-power variables and are neither univariate nor multivariate, the GCD algorithm selection module 312 selects the MGCD algorithm module 320 to calculate the GCD of the two input polynomials.

MGCD algorithm module 320 includes MGCD sub-process module 322 and PGCD sub-process module 324. MGCD sub-process module 322 is implemented to reduce a multivariate integer GCD problem to a series of k-variate $Z_p$ field GCD problems by applying modular homomorphism. PGCD sub-process module 324 is configured to reduce the k-variate $Z_p$ field GCD problems generated by MGCD sub-process module 322 to a series of (k−1)-variate $Z_p$ field GCD problems by recursively applying evaluation homomorphism. Processing performed by an example MGCD algorithm module 320 is described in further detail below with reference to FIGS. 5 and 6.

Although illustrated in FIG. 3 as being stored in memory 304 of computing device 300, computer algebra module 306, or portions thereof, may be implemented using any form of computer-readable media that is accessible by computing device 300. Computer-readable media may include, for example, computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media embodies computer readable instructions, data structures, program modules, or other data in a modulated data signal, such as a carrier wave or other transport mechanism. Computer storage media does not include communication media.

Example Operation

Figure 4:
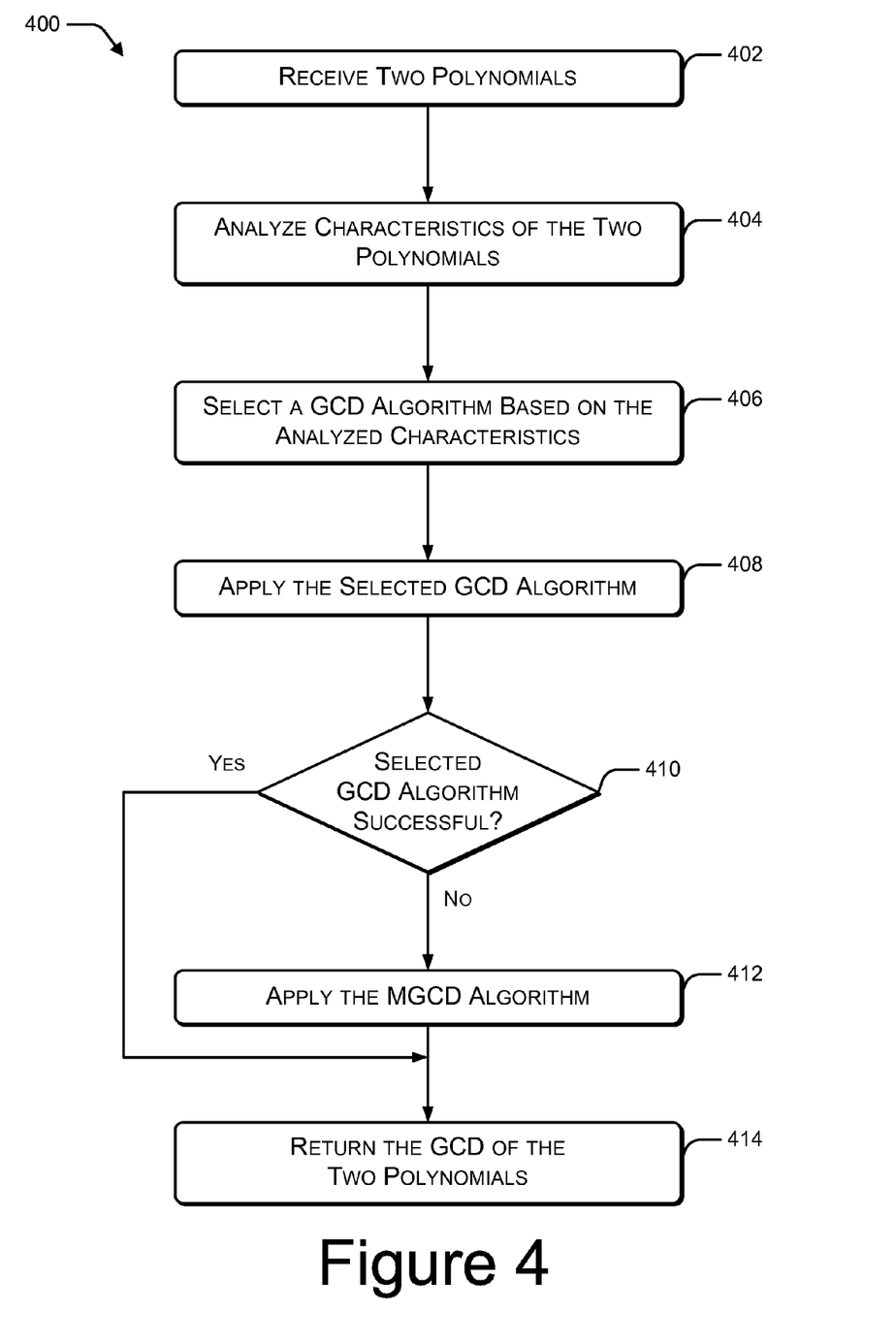
FIG. 4 is a flow diagram of an example process for calculating the GCD of two polynomials.

FIG. 4 is a flow diagram of an example process 400 for calculating the greatest common divisor of two polynomials. This process is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, cause the processors to perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while this process is described with reference to the computing device 300 of FIG. 3, other computer architectures may implement this process in whole or in part.

At 402, two input polynomials are received. For example, computer algebra module 306 receives two user-submitted polynomials.

At 404, characteristics of the received polynomials are analyzed. For example, polynomial analysis module 310 analyzes the user-submitted polynomials to determine whether the polynomials are univariate (i.e., having only a single variable), multivariate (i.e., having more than three variables), or neither (i.e., having two or three variables). Polynomial analysis module 310 also analyzes the user-submitted polynomials to determine whether the polynomials contain large coefficients (e.g., larger than the maximum number supported by processor 302), high-power variables (e.g., powers greater than 1000), or sparse powers across the variables.

At 406, a GCD algorithm is selected based on the determined characteristics of the received polynomials. For example, GCD algorithm selection module 312 selects the PRS algorithm, the HEU algorithm, the EZGCD algorithm, or the MGCD algorithm based on the combination of characteristics found in the user-submitted polynomials. FIG. 2, described above, provides example sets of characteristic combinations and corresponding algorithms.

At 408, the selected algorithm is applied. For example, if GCD algorithm selection module 312 selects the PRS algorithm, then the PRS algorithm module 314 calculates the GCD of the two user-submitted polynomials, according to the PRS algorithm. Similarly, if GCD algorithm selection module 312 selects that HEU, EZGCD, or MGCD algorithms, then the HEU algorithm module 316, EZGCD algorithm module 318, or MGCD algorithm module 320, respectively, calculates the GCD of the two user submitted polynomials.

At 410, a determination is made as to whether or not the selected GCD algorithm successfully calculated the GCD of the received polynomials. For example, computer algebra module 306 verifies that a valid GCD was output from the algorithm module corresponding to the selected GCD algorithm. If computer algebra module 306 determines that no valid GCD was output (the "No" branch from block 410), then at 412, computer algebra module 306 calls the MGCD algorithm module 320 to calculate the GCD of the input polynomials.

At 414, the calculated GCD of the input polynomials is returned. For example, a symbolic representation of the GCD is output to a display device associated with computing device 300.

Figure 5:
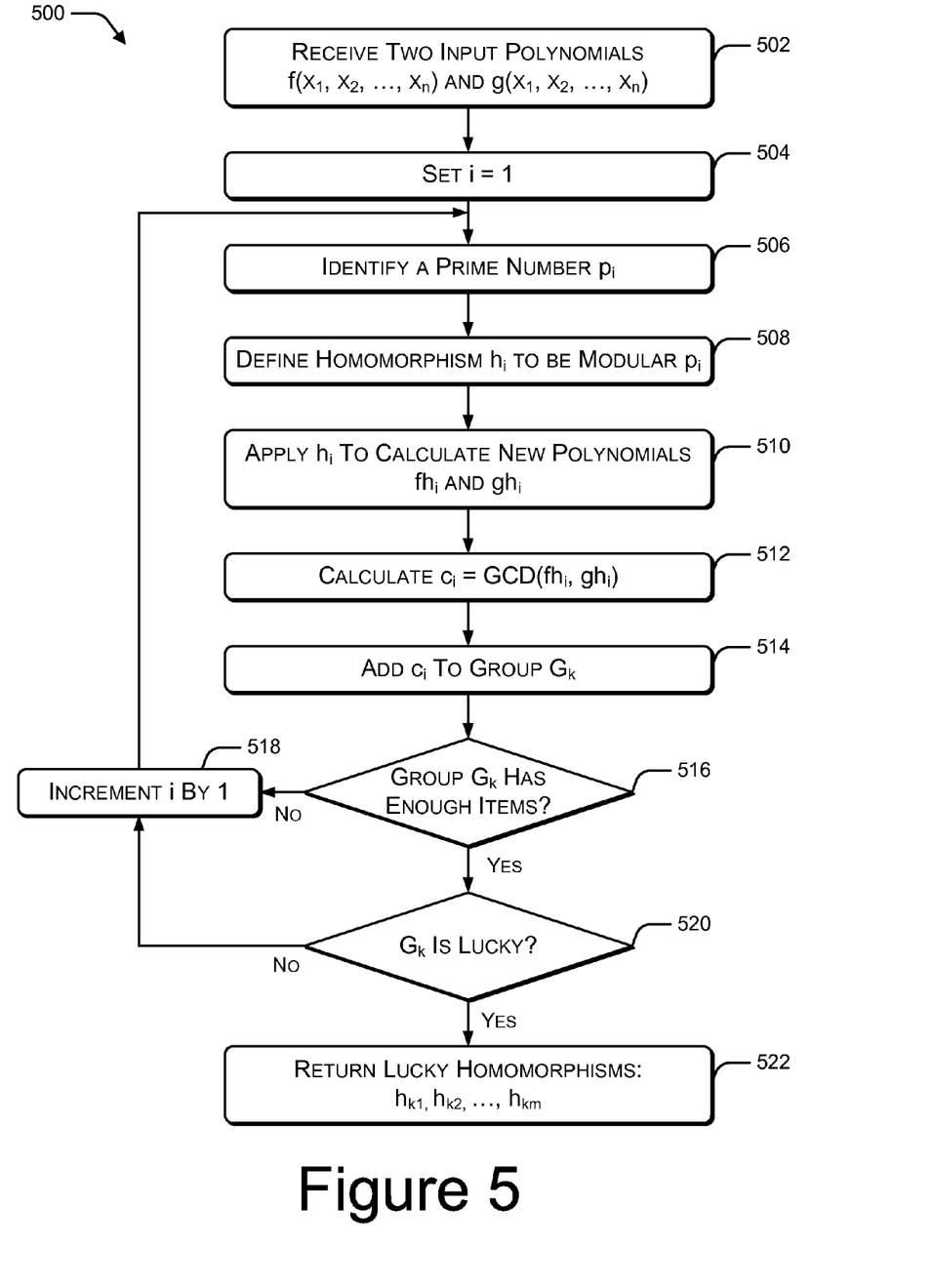
FIG. 5 is a flow diagram of an example process for calculating the GCD of two polynomials according to an MGCD algorithm.

FIG. 5 is a flow diagram of an example process 500 for calculating the greatest common divisor of two polynomials according to an MGCD algorithm. This process is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, cause the processors to perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while this process is described with reference to the computing device 300 of FIG. 3, other computer architectures may implement this process in whole or in part.

At 502, two input polynomials $f(x_1, x_2, \ldots, x_n)$ and $g(x_1, x_2, \ldots, x_n)$ are received. For example, MGCD algorithm module 320 receives two polynomials as a result of processing performed by GCD algorithm selection module 312. Blocks 504-510 and 514-522 represent processing performed by MGCD sub-process module 322. Block 512 represents processing performed by PGCD sub-process module 324.

At 504, a counter variable, i, is initialized to a value of 1 at the beginning of a processing loop represented by blocks 506-520.

At 506, a prime number, $p_i$, is identified, and at 508, homomorphism $h_i$ is defined to be modular $p_i$.

At 510, homomorphism $h_i$ is applied to $f(x_1, x_2, \ldots, x_n)$ and $g(x_1, x_2, \ldots, x_n)$, resulting in two new polynomials, $f_{h_i}$ and $g_{h_i}$.

At 512, the GCD of $f_{h_i}$ and $g_{h_i}$ is calculated. For example, $f_{h_i}$ and $g_{h_i}$ are provided as input to PGCD sub-process module 324. Processing performed by an example PGCD sub-process module 324 is described in further detail below with reference to FIG. 6.

At 514, $c_i$ (the GCD of $f_{h_i}$ and $g_{h_i}$) is added to a group, $G_k$, where k is the degree of the GCD $c_i$.

At 516, a determination is made as to whether or not group $G_k$ has enough items. For example, $G_k$ is determined to have enough items if:

$$\Pi_{j=1}^{m} p_{k_j} > \text{threshold}$$

where:

$$\text{threshold} = 2^{\min(\deg(f, x_n), \deg(g, x_n))} \cdot |gcd(l\ \text{coeff}(f), l\ \text{coeff}(g))| \cdot \min(\|f\|_\infty, \|g\|_\infty)$$

where "l coeff(f)" represents f's leading coefficient and "l coeff(g)" represents g's leading coefficient.

If $G_k$ does not have enough items, then at block 518, i is incremented by 1, and processing continues as described above with reference to block 506, with the selection of a new prime number.

If $G_k$ is determined to have enough items, then at block 520, MGCD sub-process module 322 determines whether or not $G_k$ is lucky. For example, MGCD sub-process module 322 uses the Chinese Remainder algorithm to identify a polynomial, c, from $G_k$. If c|f and c|g, then it is determined that $G_k$ is lucky.

If $G_k$ is not determined to be lucky, then processing continues as described above with reference to block 518. If $G_k$ is determined to be lucky, then at 522, lucky homomorphisms $h_{k_1}, h_{k_2}, \ldots, h_{k_m}$ are returned.

Figure 6:
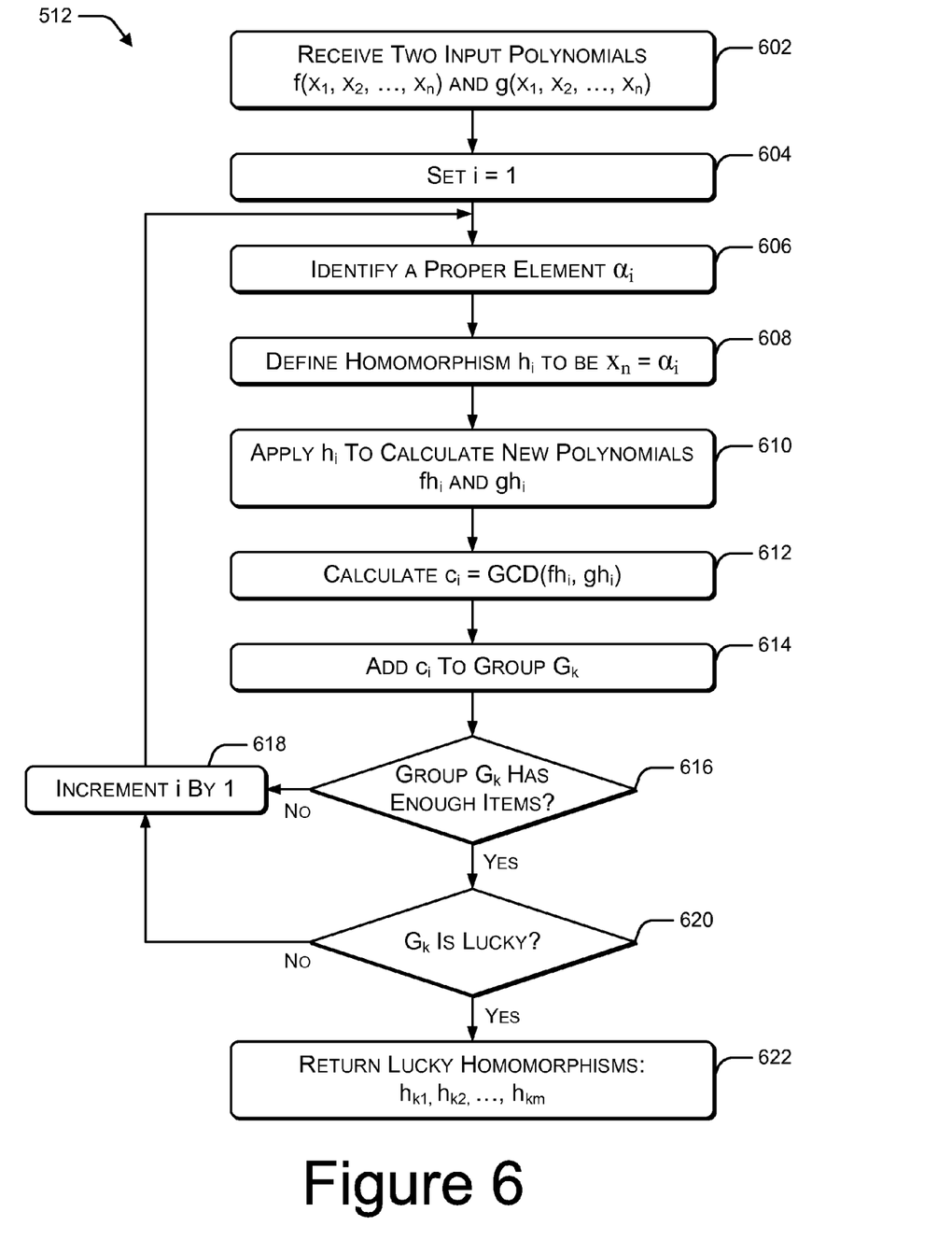
FIG. 6 is a flow diagram of an example process for calculating the GCD of two polynomials according to a PGCD sub-process of the MGCD algorithm.

FIG. 6 is a flow diagram of an example PGCD sub-process 512 of an MGCD algorithm. This process is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, cause the processors to perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while this process is described with reference to the computing device 300 of FIG. 3, other computer architectures may implement this process in whole or in part.

At 602, two input polynomials $f(x_1, x_2, \ldots, x_n)$ and $g(x_1, x_2, \ldots, x_n)$ are received. For example, PGCD sub-process module 324 receives two polynomials ($f_{h_i}$ and $g_{h_i}$) as a result of processing performed by MGCD sub-process module 322.

At 604, a counter variable, i, is initialized to a value of 1 at the beginning of a processing loop represented by blocks 606-620.

At 606, a proper element, $\alpha_i$ of $Z_p$, is identified, and at 608, homomorphism $h_i$ is defined to be $x_n = \alpha_i$.

At 610, homomorphism $h_i$ is applied to $f(x_1, x_2, \ldots, x_n)$ and $g(x_1, x_2, \ldots, x_n)$, resulting in two new polynomials, $f_{h_i}$ and $g_{h_i}$.

At 612, the GCD of $f_{h_i}$ and $g_{h_i}$ is calculated. For example, the PGCD sub-process is performed recursively to calculate the modular GCD.

At 614, $c_i$ (the GCD of $f_{h_i}$ and $g_{h_i}$) is added to a group, $G_k$, where k is the degree of the GCD $c_i$.

At 616, a determination is made as to whether or not group $G_k$ has enough items. For example, $G_k$ is determined to have enough items if:

$$\text{MembersCount}(G_k) > \text{threshold}$$

where:

$$\text{threshold} = \min(deg(f,x_n), deg(g,x_n)) + deg(gcd(f_{lc}, g_{lc}), x_n)$$

where $f_{lc}(x_n)$ represents the leading coefficient of f on variables $\{x_1, x_2, \ldots, x_{n-1}\}$ and where $g_{lc}(x_n)$ represents the leading coefficient of g on variables $\{x_1, x_2, \ldots, x_{n-1}\}$.

If $G_k$ does not have enough items, then at block 618, i is incremented by one, and processing continues as described above with reference to block 606, with the identification of a new proper element, $\alpha_i$ of $Z_p$.

If $G_k$ is determined to have enough items, then at block 620, PGCD sub-process module 324 determines whether or not $G_k$ is lucky. For example, PGCD sub-process module 324 uses the Newton interpolation algorithm to identify a polynomial, c, from $G_k$. If c|f and c|g, then it is determined that $G_k$ is lucky.

If $G_k$ is not determined to be lucky, then processing continues as described above with reference to block 618. If $G_k$ is determined to be lucky, then at 622, lucky homomorphisms $h_{k_1}, h_{k_2}, \ldots, h_{k_m}$ are returned.

In both the MGCD sub-process (illustrated in FIG. 5) and the PGCD sub-process (illustrated in FIG. 6), computational expense is reduced by grouping the identified possible GCDs ($c_i$), and then determining whether a group has a sufficient number of members.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    identifying, by a computing device executing a computer algebra module for manipulating mathematical expressions in symbolic form, characteristics of first and second polynomials, wherein the characteristics include:
        coefficient characteristics;
        variable characteristics; and
        variable power characteristics;
    based on the characteristics that are identified, selecting, by the computing device, a particular greatest common divisor (GCD) algorithm from a plurality of GCD algorithms;
    applying, by the computing device, the particular GCD algorithm to the first and second polynomials; and
    returning, by the computing device, a GCD of the first and second polynomials.

2. A method as recited in claim 1, wherein identifying the characteristics of the first and second polynomials includes determining whether or not the first and second polynomials include large coefficients.

3. A method as recited in claim 1, wherein identifying the characteristics of the first and second polynomials includes determining whether or not the first and second polynomials include variables to a high power.

4. A method as recited in claim 1, wherein identifying the characteristics of the first and second polynomials includes determining whether or not the first and second polynomials include a sparse distribution of variable powers.

5. A method as recited in claim 1, wherein identifying the characteristics of the first and second polynomials includes determining a number of variables represented in the first and second polynomials.

6. A method as recited in claim 1, wherein identifying the characteristics of the first and second polynomials includes determining whether the first and second polynomials are:
    univariate, having only a single variable;
    multivariate, having more than three variables; or
    neither univariate nor multivariate, having exactly two or three variables.

7. A method as recited in claim 1, wherein:
    the plurality of greatest common divisor (GCD) algorithms includes:
        a polynomial remainder sequences (PRS) GCD algorithm;
        a heuristic (HEU) GCD algorithm;
        an extended Zassenhaus GCD (EZGCD) algorithm; and
        a modular GCD (MGCD) algorithm; and
    selecting the particular GCD algorithm from the plurality of GCD algorithms comprises:
        in an event that the first and second polynomials are univariate polynomials with large coefficients, selecting the PRS GCD algorithm;
        in an event that the first and second polynomials include either high power variables or variables with a sparse distribution of powers, but not both, selecting the HEU GCD algorithm;
        in an event that the first and second polynomials include two, and only two, variables and include two or more of large coefficients, high power variables, or variables with a sparse distribution of powers, selecting the EZGCD algorithm;
        in an event that the first and second polynomials include two, and only two, variables and include large coefficients, selecting the EZGCD algorithm;
        in an event that the first and second polynomials include three or more variables and include two or more of large coefficients, high power variables, or variables with a sparse distribution of powers, selecting the EZGCD algorithm;
        in an event that the first and second polynomials are univariate polynomials with high power variables and variables with sparse distribution of powers and do not include large coefficients, selecting the EZGCD algorithm; and
        in an event that the PRS, HEU, and EZGCD algorithms are not selected, selecting the MGCD algorithm.

8. A system comprising:
    a processor implemented in a computing device;
    a computer storage media; and
    a computer algebra module, stored in the computer storage media and executed on the processor, the computer algebra module comprising:

polynomial analysis instructions to analyze coefficient characteristics, variable characteristics, and variable power characteristics of a plurality of input polynomials;

a plurality of greatest common divisor (GCD) algorithms; and

GCD algorithm selection instructions to select a particular GCD algorithm module from the plurality of GCD algorithms based on results from the polynomial analysis instructions, the particular GCD algorithm to be applied to the plurality of input polynomials.

9. A system as recited in claim 8, wherein the plurality of greatest common divisor (GCD) algorithms comprises a polynomial remainder sequences (PRS) GCD algorithm.

10. A system as recited in claim 8, wherein the plurality of greatest common divisor (GCD) algorithms comprises a heuristic (HEU) GCD algorithm.

11. A system as recited in claim 8, wherein the plurality of greatest common divisor (GCD) algorithms comprises an extended Zassenhaus GCD (EZGCD) algorithm.

12. A system as recited in claim 8, wherein the plurality of greatest common divisor (GCD) algorithms comprises a modular GCD (MGCD) algorithm.

13. A system as recited in claim 12, wherein the MGCD algorithm includes:

an MGCD subprocess configured to:
reduce a multivariate integer GCD problem to a series of k-variate GCD problems over field $Z_p$ by recursively applying modular homomorphism; and
group potential results according to degree of variable to reduce a number of potential results to be calculated; and a PGCD subprocess configured to:
reduce the series of k-variate GCD problems over field $Z_p$ to a series of (k−1)-variate GCD problems over field $Z_p$ by recursively applying evaluation homomorphism; and
group potential results according to degree of variable to reduce a number of potential results to be calculated.

14. A system as recited in claim 8, wherein the plurality of greatest common divisor (GCD) algorithms comprises:
a polynomial remainder sequences (PRS) GCD algorithm;
a heuristic (HEU) GCD algorithm;
an extended Zassenhaus GCD (EZGCD) algorithm; and
a modular GCD (MGCD) algorithm.

15. One or more computer storage media storing computer-executable instructions that, when executed, cause one or more processors to perform operations comprising:
identifying a plurality of polynomials;
identifying characteristics of the plurality of polynomials, wherein the characteristics include:
coefficient characteristics;
variable characteristics; and
variable power characteristics;
selecting a particular greatest common divisor (GCD) algorithm from a plurality of GCD algorithms based on the characteristics of the plurality of polynomials; and
executing the particular GCD algorithm to calculate a GCD of the plurality of polynomials.

16. One or more computer storage media as recited in claim 15, wherein the particular GCD algorithm is a modular GCD (MGCD) algorithm, and executing the particular GCD algorithm comprises:
performing recursive operations including:
identifying a prime number, p;
defining a homomorphism $h_p$ as modular p;
applying $h_p$ to each of the plurality of polynomials, resulting in a plurality of modified polynomials;
calculating the GCD, $c_i$, of the plurality of modified polynomials, $c_i$ having degree k;
adding $c_i$ to a group, $G_k$; and
determining whether the group has a sufficient number of items; and
in an event that the group has a sufficient number of items, terminating the recursive operations.

17. One or more computer storage media as recited in claim 16, wherein the plurality of polynomials include polynomials f and g; and the group has a sufficient number of items if:

$\Pi_{j=1}^{m} p_{k_j} > \text{threshold}$ where:

$\text{threshold} = 2^{\min(\deg(f,x_n),\deg(g,x_n))} \cdot |\gcd(l\ \text{coeff}(f), l\ \text{coeff}(g))| \cdot \min(\|f\|_\infty, \|g\|_\infty)$ where l coeff(f) represents f's leading coefficient and l coeff(g) represents g's leading coefficient.

18. One or more computer storage media as recited in claim 16, wherein the plurality of modified polynomials are expressed in terms of a variable, x, calculating the GCD, $c_i$, of the plurality of modified polynomials comprises:
performing a second set of recursive operations including:
identifying a field, $Z_p$, over which the plurality of modified polynomials are defined;
identifying a proper element, $\alpha_i$ of $Z_p$;
defining a homomorphism $h_i$ as $x_n = \alpha_i$;
applying $h_i$ to each of the plurality of modified polynomials, resulting in a plurality of new modified polynomials;
calculating the GCD, $d_i$, of the plurality of new modified polynomials, $d_i$ having degree j;
adding $d_i$ to a group, $H_j$; and
determining whether $H_j$ has a sufficient number of items; and
in an event that $H_j$ has a sufficient number of items, terminating the second set of recursive operations.

19. One or more computer storage media as recited in claim 18, wherein the plurality of polynomials include polynomials $f(x_1, x_2, \ldots, x_{n-1})$ and $g(x_1, x_2, \ldots, x_{n-1})$; and $H_j$ has a sufficient number of items if:

$\text{MembersCount}(H_j) > \text{threshold}$ where:

$\text{threshold} = \min(\deg(f,x_n), \deg(g,x_n)) + \deg(\gcd(f_{lc}, g_{lc}), x_n)$ where $f_{lc}(x_n)$ represents the leading coefficient of f on variables $\{x_1, x_2, \ldots, x_{n-1}\}$ and where $g_{lc}(x_n)$ represents the leading coefficient of g on variables $\{x_1, x_2, \ldots, x_{n-1}\}$.

* * * * *